US006882865B2

(12) United States Patent
Yuan et al.

(10) Patent No.: US 6,882,865 B2
(45) Date of Patent: Apr. 19, 2005

(54) FIXING STRUCTURE FOR INPUT KEYS

(75) Inventors: Jie Yuan, Nanjing (CN); Chengshing Lai, Taipei (TW)

(73) Assignee: Inventec Electronics (Nanjing), Nanjing (CN)

( * ) Notice: Subject to any disclaimer, the term of this patent is extended or adjusted under 35 U.S.C. 154(b) by 795 days.

(21) Appl. No.: 09/952,204

(22) Filed: Sep. 10, 2001

(65) Prior Publication Data

US 2002/0042249 A1 Apr. 11, 2002

(30) Foreign Application Priority Data

Sep. 12, 2000 (CN) ........................................ 00249202 U

(51) Int. Cl.[7] .............................................. H04M 1/00
(52) U.S. Cl. ............................. 455/556.2; 379/433.11; 715/864
(58) Field of Search ................................ 455/90.3, 346, 455/351, 550.1, 556.1, 556.2; 379/110.01, 428.01, 428.03, 429, 433.01, 433.06, 433.07, 433.11, 433.13, 440; 715/700, 864

(56) References Cited

U.S. PATENT DOCUMENTS

| 4,524,249 A | | 6/1985 | Farrell |
| 5,335,273 A | * | 8/1994 | Takagi et al. ............ 379/433.13 |
| 5,584,054 A | * | 12/1996 | Tyneski et al. ............... 455/566 |
| 5,646,649 A | * | 7/1997 | Iwata et al. ................... 345/173 |
| 5,657,370 A | * | 8/1997 | Tsugane et al. ............... 455/566 |
| 5,661,641 A | * | 8/1997 | Shindo ......................... 361/814 |
| 5,677,949 A | * | 10/1997 | Macor .......................... 379/354 |
| 5,719,936 A | * | 2/1998 | Hillenmayer ................. 379/447 |
| D410,645 S | * | 6/1999 | Wood et al. ................. D14/138 |
| 5,933,783 A | * | 8/1999 | Kawakami et al. .......... 455/566 |
| D413,885 S | * | 9/1999 | Irimajiri et al. ............. D14/144 |
| D426,218 S | * | 6/2000 | Abed et al. ................. D14/136 |
| 6,128,475 A | * | 10/2000 | Wicks et al. .............. 455/575.4 |
| D434,019 S | * | 11/2000 | Abed et al. ................. D14/138 |
| 6,149,442 A | * | 11/2000 | Enright ........................ 439/31 |
| 6,226,501 B1 | * | 5/2001 | Weadon et al. ........... 455/575.3 |
| 6,259,932 B1 | * | 7/2001 | Constien .................... 455/556.1 |
| D447,740 S | * | 9/2001 | Johansson ................... D14/138 |
| 6,397,078 B1 | * | 5/2002 | Kim .......................... 455/556.2 |
| 6,434,371 B1 | * | 8/2002 | Claxton ....................... 455/90.1 |
| 6,434,404 B1 | * | 8/2002 | Claxton et al. ........... 455/575.3 |
| 6,507,336 B1 | * | 1/2003 | Lunsford ..................... 345/168 |
| 6,535,749 B1 | * | 3/2003 | Iwata et al. ............... 455/556.2 |
| 6,704,417 B1 | * | 3/2004 | Kim ...................... 379/433.07 |
| 6,704,585 B1 | * | 3/2004 | Hiebel ....................... 455/575.3 |
| D488,453 S | * | 4/2004 | Chang et al. ............... D14/138 |
| 6,731,753 B1 | * | 5/2004 | Park et al. .............. 379/433.07 |
| 6,751,446 B1 | * | 6/2004 | Kim et al. ................... 455/90.1 |
| 6,766,181 B1 | * | 7/2004 | Newman et al. .......... 455/575.3 |
| 6,775,560 B1 | * | 8/2004 | King et al. ................... 455/566 |
| 6,807,430 B1 | * | 10/2004 | Woods et al. ............. 455/550.1 |
| 2001/0034229 A1 | * | 10/2001 | Park et al. ................... 455/426 |
| 2001/0046290 A1 | * | 11/2001 | Kim ...................... 379/433.01 |
| 2004/0266475 A1 | * | 12/2004 | Mirza et al. .............. 455/550.1 |

FOREIGN PATENT DOCUMENTS

| DE | 9412474 | 8/1994 |
| EP | 0 631 416 A3 | 6/1994 |

* cited by examiner

*Primary Examiner*—Roland Foster
(74) *Attorney, Agent, or Firm*—Merchant & Gould P.C.

(57) ABSTRACT

The present invention offers a fixing structure for input keys, applied in personal digital assistant provided with function of a mobile telephone. On the backside of the case of a framework are provided a plurality of positioning elements and a plurality of thermomeltable elements respectively. On said positioning elements and thermomeltable elements are sheathed consecutively with elastic sheet, plate, circuit board and fixing plate. Each end of said thermomeltable elements is accommodated in corresponding recessed hole provided in said fixing plate to avoid interference with other parts. Pressing keys set up on elastic sheet can be just protruded from the case respectively, and by means of a bottom plate kept flat against the whole bottom, the fixing structure is completed. In this way, not only is the aim to decrease thickness of PDA achieved, but also it is convenient for users to carry.

5 Claims, 4 Drawing Sheets

US 6,882,865 B2

FIXING STRUCTURE FOR INPUT KEYS

FIELD OF THE INVENTION

The present invention is related to a fixing structure for input keys, particularly to a fixing structure applied in personal digital assistant provided with function of a mobile telephone.

BACKGROUND OF THE INVENTION

Personal digital assistant (PDA) is increasingly favored by people because of small volume, good functionality and low price (becoming increasingly lower day by day). However, along with the rapid development of communication products in recent years, in order to meet requirements of various users manufacturers incessantly develop various kinds of communication products, and PDA is added with function of a mobile telephone. In application, besides the primary functionality of PDA, function of mobile telephone is also incorporated, so that the function of PDA is perfected and fortified.

However, at present in the PDA with mobile telephone function produced by various manufacturers, the function of telephone is usually carried out through following mode in operation:

In operation of PDA as a mobile telephone, special light stylus screen (or touch-sensitive screen) is applied and dialing is carried out by software method. Nevertheless, practice shows that calling on telephone by dialing according to the above method is very inconvenient in application.

On the other hand, some PDA have a plurality of keys set up on a turnover lid, and thereby dialing is carried out by means of said keys on the turnover lid. However, with such mode of telephone dialing, the overall construction of PDA is rather bulky and inconvenient in carrying, and furthermore it contravenes the feature of PDA, which is all-round in function and small in volume.

As described above, conventional personal digital assistant with function of mobile telephone is not only complicated in operation, but also bulky in volume and inconvenient for users to carry. Improvement of such PDA is necessary. Therefore, users will be delighted to see that the function of PDA is perfected and fortified, and that it is small in thickness, convenient in carrying and more friendly and acceptable in operation.

SUMMARY OF THE INVENTION

The aim of the present invention is to provide a fixing structure for input keys, which is small in thickness, and is capable to be applied in PDA with function of mobile telephone. The improvement will further overcome the shortcoming of complication in operation, bulkiness and inconvenience in carrying.

The fixing structure of the present invention comprises a framework, on the backside of the case are provided with a plurality of positioning elements and a plurality of thermomeltable elements respectively. On said positioning elements and thermomeltable elements are sheathed consecutively with elastic sheet, plate, circuit board and fixing plate. Each end of said thermomeltable elements is accommodated in corresponding recessed hole provided in said fixing plate so as to avoid interference with other parts, and pressing keys set up on the elastic sheet can be just exposed from the case respectively. Said fixed structure is completed with a bottom plate kept flat against the whole back of the fixing plate. In this way, said elements are perfected and fortified within the finite casing space. At the same time, the aim to decrease thickness of PDA is achieved, and shortcoming of complication in operation, bulkiness and inconvenience in carrying is overcome.

BRIEF DESCRIPTION OF THE DRAWINGS

In order to further recognize and understand the aim, configuration, features and effect of the present invention, an embodiment is elucidated in detail with the help of accompanying drawings, as follows.

DETAILED DESCRIPTION OF THE PREFERRED EMBODIMENTS

Figure 1:
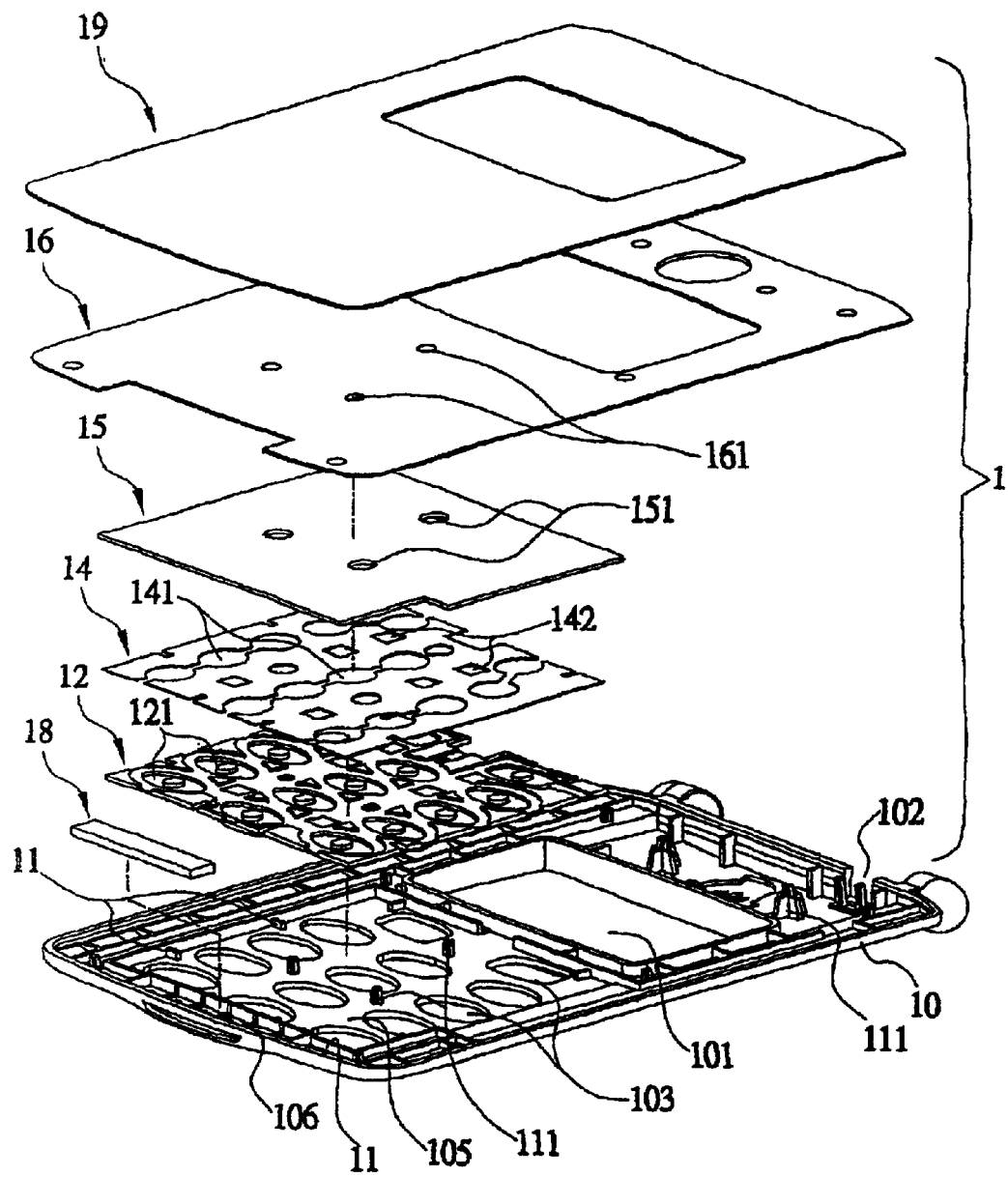
FIG. 1 is a schematic exploded perspective view of the present invention.

As shown in FIGS. 1, 2, 3 & 4, the present invention is a fixing structure for input keys, which can be applied in personal digital assistant provided with function of a mobile telephone. The framework 1 of the fixing structure comprises a case 10, in which are provided opening 101, gap 102 and a plurality of through holes 103 respectively (as shown in FIG. 1). Moreover, on the backside of the case 10 are provided a plurality of positioning elements 11 and a plurality of thermomeltable elements 111 respectively. These positioning elements 11 are utilized to separate the positioning region into circuit board positioning region 105 and magnet positioning region 106 for various different components. In the present embodiment, the circuit board positioning region 105 is set adjacent to the underside of opening 101, magnet positioning region 106 is set adjacent to underside of circuit board positioning region 105, and said positioning elements 11 are ribs of multi-ply plate. Said thermomeltable elements 111 are thermomeltable pillar of cruciform cross section, but those persons skilled in the art should realize that the latter could also be replaced by other elements.

Figure 2:
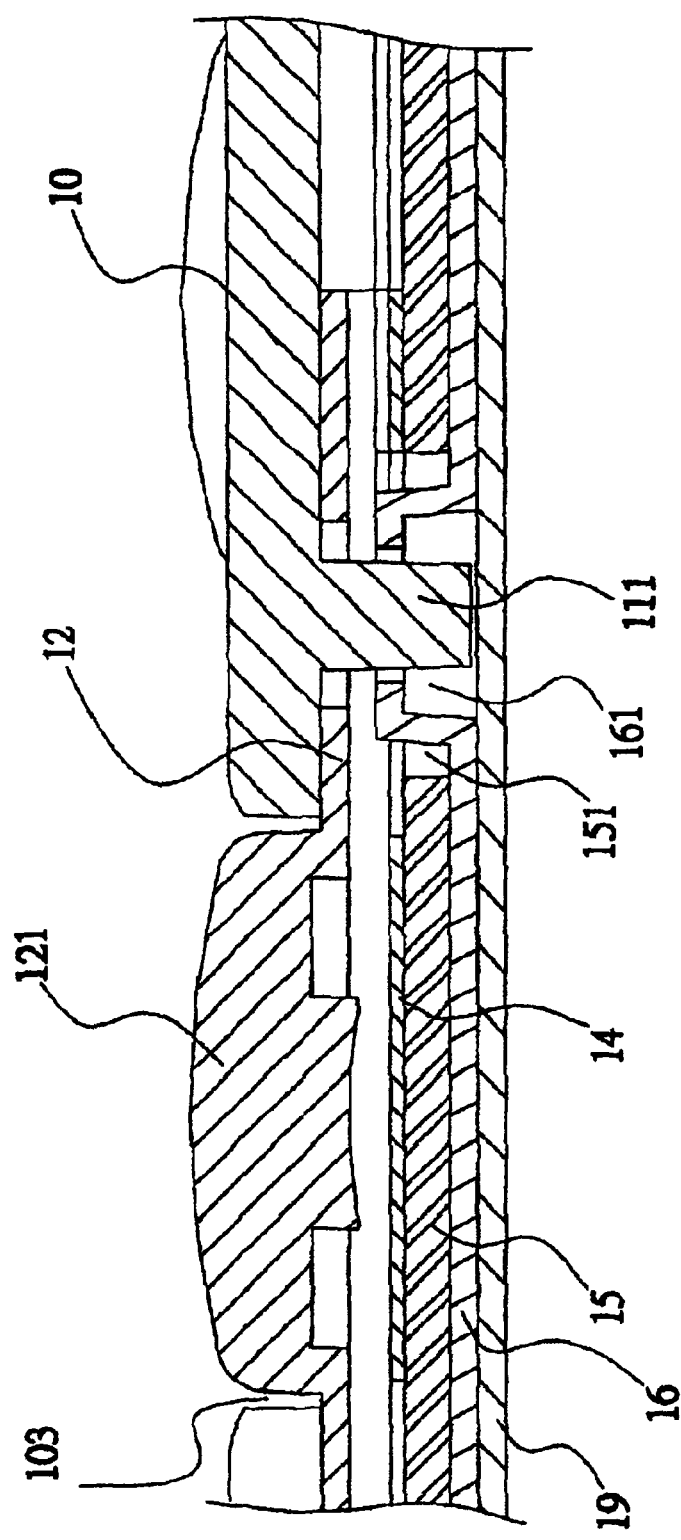
FIG. 2 is the first schematic partial sectional side view of the components of the present invention.

In the present invention, in circuit board positioning region 105 are provided elastic sheet 12, on which a plurality of keys 121 are mounted and protruded (as shown in FIGS. 1 & 2). Said keys 121 are just exposed out respectively from a plurality of through holes 103 set on the case 10, and at the back of said keys 121 are each set with electric conductive layer (not shown in drawing). As any one of said keys 121 is pressed down, a signal is transmitted via said conductive layer. Moreover, on the surface of each said key are provided numeral, alphabet or symbol respectively (not shown in drawing).

In the present invention, on the back of elastic sheet 12 is provided a plate 14, in which are set a plurality of venting passages 141 and a plurality of openings 142 (as shown in FIGS. 1 & 2) respectively. Said venting passages 141 are arranged respectively around said keys. As any one of said keys 121 is pressed down, any trapped air is vented through said venting passage, and action of key will not be hindered due to pressure of trapped air.

In the present invention, on the back of plate 14 is provided a circuit board 15 (as shown in FIGS. 1 & 2), in which are set a plurality of light-emitting diodes (not shown in the drawings) and a plurality of positioning holes 151. Said light-emitting diodes can be just accommodated in a plurality of openings 142. As any one of said keys 121 is pressed down, the electric circuit on the circuit board 15 is switched into conduction via said conductive layer set up at back of said key 121. Simultaneously, said diode would emit light correspondingly.

Figure 3:
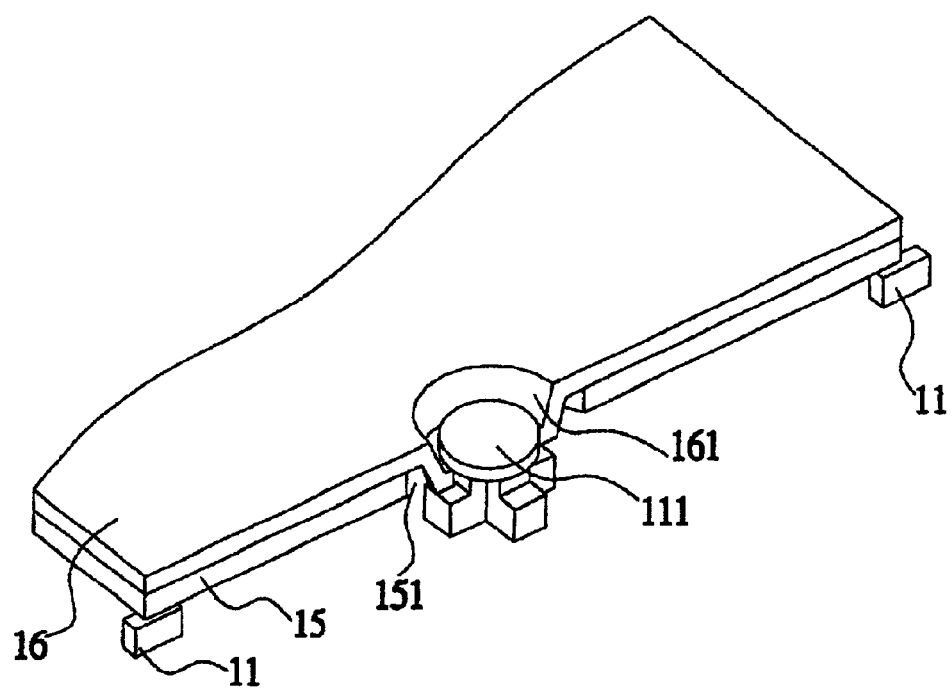
FIG. 3 is the second schematic partial sectional side view of the component of the present invention.

In the present invention, on the back of circuit board 15 is provided a fixing plate 16, which can be kept flat against the whole back of the case 10. Moreover, a plurality of holes 161 (as shown in FIGS. 1 & 2) are provided on the fixing plate 16. The thermomeltable elements 111 on the case 10 are sheathed consecutively with elastic sheet 12, plate 14 and circuit board 15, and one end of each thermomeltable element is received in the hole 161 of the fixing plate 16 (as shown in FIGS. 2 & 3) respectively, so that the molten head of said end after melting can be completely accommodated in the said holes 161, avoiding the interference with other elements.

Figure 4:
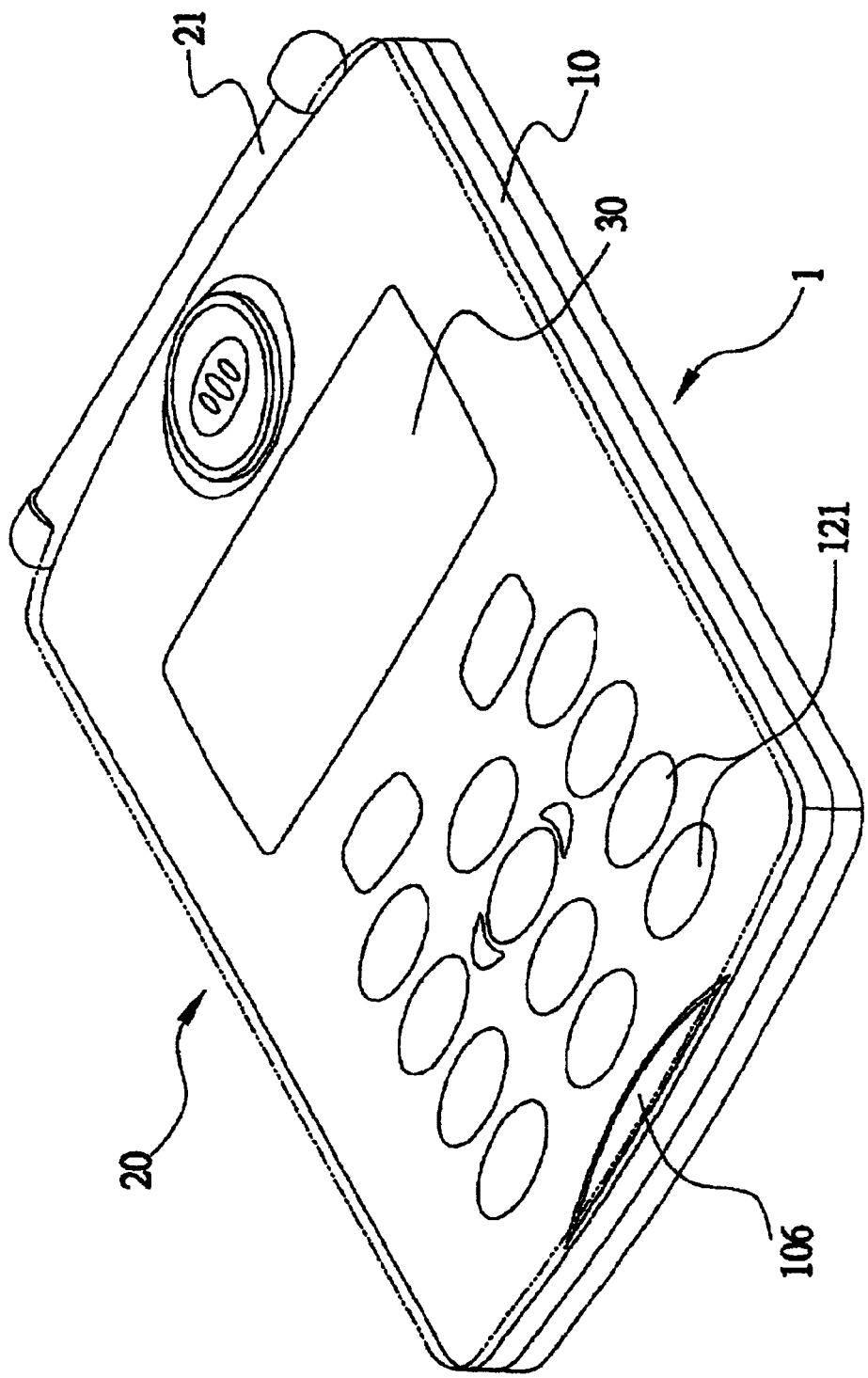
FIG. 4 is a schematic view of the present invention in assembled state.

In the present invention, in magnet positioning region 106 is provided a magnet 18 (as shown in FIG. 1), by which the turnover lid is caught on framework 1 through magnetic force (as shown in FIG. 4). The swinging shaft of the turnover lid 20 is mounted on corresponding location of magnet positioning region 106 of framework 1. In addition, in the opening 101 of the case 10 can be arranged a displaying screen 30, through which relevant information is displayed.

In the present invention, a bottom plate 19 included to be kept flat against the whole backside of fixing plate 16 (as shown in FIG. 1). All components in framework 1 are fixed by the arrangement of bottom plate 19, which is also used to secure elastic sheet 12 and circuit board 15. In addition, gap 102 of the case 10 provides the space for connection of the turnover lid 20 to the external circuit.

Herein, by means of the arrangement of fixing structure for all components within framework 1 in the present invention, said components are perfected and fortified within limited space in framework 1. At the same time, the aim to decrease thickness of PDA is achieved, and shortcoming of complication in operation, bulkiness and inconvenience in carrying is overcome.

The above illustration and explanation are just an example to elucidate the embodiment of the present invention. Those persons skilled in the art may realize that various equivalent modifications of details can be made in the embodiment, and all these modifications are intended to be included in the scope and spirit of the present invention.

What is claimed is:

1. A fixing structure for input keys, applied in PDA with function of a mobile telephone, wherein comprising:

a case, in which are provided opening and a plurality of through holes respectively, and on the backside of said case are provided a plurality of positioning elements and plurality of thermomeltable elements, said positioning elements are used to partition circuit board positioning region;

an elastic sheet, set up in said circuit board positioning region, on said elastic sheet a plurality of keys are mounted and protruded, said keys are just exposed out respectively from a plurality of through holes of the case, and the backs of said keys are each provided with electric conductive layer;

a plate, set on the back of said elastic sheet, and in said plate a plurality of venting passages are arranged around each key respectively;

a circuit board, mounted on back of said plate, and a plurality of positioning holes are provided in said circuit board;

a fixing plate, mounted on back of said circuit board, said fixing plate can be kept flat against the whole back of the case, a plurality of holes is provided on fixing plate, so that thermomeltable elements of the case are sheathed consecutively with elastic sheet, plate and circuit board, and one end of each said thermomeltable element is received in plurality of holes of the fixing plate respectively;

a displaying screen, just fit in opening of said case;

a bottom plate, kept flat against the whole backside of said fixing plate, and the components in said case are fixed by the arrangement of said bottom plate, which is also used to secure elastic sheet and circuit board.

2. A fixing structure for input keys as defined in claim 1, wherein said circuit board positioning region is arranged adjacent to the underside of the opening, said magnet positioning region is arranged adjacent to the underside of the circuit board positioning region, and said poisoning elements are ribs, said thermo-meltable elements are thermomeltable cruciform pillars.

3. A fixing structure for input keys as defined in claim 1, wherein a plurality of holes are provided in said plate, and a plurality of light-emitting diodes set in said circuit board can be just accommodated in said plurality of holes.

4. A fixing structure for input keys as defined in claim 1, wherein said positioning elements separate out magnet positioning region, which can just accommodate a magnet, by means of said magnet, the turnover lid is caught on said case through magnetic force, and the swinging shaft of said turnover lid is mounted on corresponding location of magnet positioning region of the case.

5. A fixing structure for input keys as defined in claim 4, wherein a gap is provided in backside of said case, and said gap provides the space for connection of said turnover lid to the external circuit.

* * * * *